United States Patent
Fume et al.

(10) Patent No.: US 9,304,987 B2
(45) Date of Patent: Apr. 5, 2016

(54) CONTENT CREATION SUPPORT APPARATUS, METHOD AND PROGRAM

(71) Applicant: KABUSHIKI KAISHA TOSHIBA, Minato-ku, Tokyo (JP)

(72) Inventors: Kosei Fume, Kawasaki (JP); Masahiro Morita, Yokohama (JP)

(73) Assignee: Kabushiki Kaisha Toshiba, Minato-ku, Tokyo (JP)

( * ) Notice: Subject to any disclaimer, the term of this patent is extended or adjusted under 35 U.S.C. 154(b) by 0 days.

(21) Appl. No.: 14/301,378

(22) Filed: Jun. 11, 2014

(65) Prior Publication Data

US 2014/0365217 A1 Dec. 11, 2014

(30) Foreign Application Priority Data

Jun. 11, 2013 (JP) ................................. 2013-122953

(51) Int. Cl.

| G10L 15/00 | (2013.01) |
|---|---|
| G06F 17/27 | (2006.01) |
| G10L 13/08 | (2013.01) |
| G10L 15/26 | (2006.01) |
| G10L 13/033 | (2013.01) |

(52) U.S. Cl.
CPC ............. *G06F 17/2755* (2013.01); *G10L 13/08* (2013.01); *G10L 13/033* (2013.01); *G10L 15/26* (2013.01)

(58) Field of Classification Search
CPC ......... G10L 13/00; G10L 13/08; G10L 15/26; G10L 15/22; G10L 13/027; G10L 13/04; G10L 17/00; G10L 15/16; G10L 15/24; G06F 17/27

USPC ............ 704/235, 9, 275, 270, 260, 258, 246, 704/243, 231, 201, 2; 706/46, 21; 382/153; 381/71.8

See application file for complete search history.

(56) References Cited

U.S. PATENT DOCUMENTS

| 6,587,846 | B1 * | 7/2003 | LaMuth | G06N 3/004 706/21 |
|---|---|---|---|---|
| 6,683,960 | B1 * | 1/2004 | Fujii | G10K 11/178 381/71.1 |
| 7,200,555 | B1 * | 4/2007 | Ballard | G10L 15/22 704/235 |
| 8,145,492 | B2 * | 3/2012 | Fujita | G10L 13/00 704/203 |
| 8,515,749 | B2 * | 8/2013 | Stallard | G10L 15/26 379/114.01 |
| 2003/0055653 | A1 * | 3/2003 | Ishii | A63H 11/00 704/275 |

(Continued)

FOREIGN PATENT DOCUMENTS

JP 2011-242637 A 12/2011

*Primary Examiner* — Michael Colucci
(74) *Attorney, Agent, or Firm* — Ohlandt, Greeley, Ruggiero & Perle, L.L.P.

(57) ABSTRACT

According to one embodiment, a content creation support apparatus includes a speech synthesis unit, a speech recognition unit, an extraction unit, a detection unit, a presentation unit and a selection unit. The speech synthesis unit performs a speech synthesis on a first text. The speech recognition unit performs a speech recognition on the synthesized speech to obtain a second text. The extraction unit extracts feature values by performing a morphological analysis on each of the first and second texts. The detection unit compares a first feature value of a first difference string and a second feature value of a second difference string. The presentation unit presents correction candidate(s) according to the second feature value. The selection unit selects one of the correction candidates in accordance with an instruction from a user.

15 Claims, 12 Drawing Sheets

(56) References Cited

U.S. PATENT DOCUMENTS

| | | | | |
|---|---|---|---|---|
| 2003/0152261 A1* | 8/2003 | Hiroe | G10L 13/047 | 382/153 |
| 2004/0019484 A1* | 1/2004 | Kobayashi | G10L 13/02 | 704/258 |
| 2007/0239455 A1* | 10/2007 | Groble | G10L 13/08 | 704/260 |
| 2009/0006087 A1* | 1/2009 | Imoto | G10L 15/26 | 704/231 |
| 2009/0259468 A1* | 10/2009 | Schroeter | G10L 17/20 | 704/246 |
| 2009/0299733 A1* | 12/2009 | Agapi | G10L 15/26 | 704/201 |
| 2009/0319270 A1* | 12/2009 | Gross | G10L 17/26 | 704/246 |
| 2010/0145704 A1* | 6/2010 | Conkie | G10L 15/063 | 704/260 |
| 2011/0307241 A1* | 12/2011 | Waibel | G10L 15/265 | 704/2 |
| 2012/0078633 A1 | 3/2012 | Fume et al. | | |
| 2012/0166180 A1* | 6/2012 | Au | G06F 17/274 | 704/9 |
| 2012/0239390 A1 | 9/2012 | Fume et al. | | |
| 2013/0080160 A1 | 3/2013 | Fume et al. | | |
| 2013/0110511 A1* | 5/2013 | Spiegel | G10L 15/22 | 704/243 |
| 2013/0226576 A1* | 8/2013 | Jaiswal | G10L 21/003 | 704/235 |
| 2013/0253909 A1* | 9/2013 | Bhattacharya | G10L 25/51 | 704/9 |
| 2014/0046891 A1* | 2/2014 | Banas | G06N 5/022 | 706/46 |
| 2014/0257815 A1* | 9/2014 | Zhao | G10L 13/08 | 704/260 |
| 2015/0006573 A1 | 1/2015 | Fusume et al. | | |

\* cited by examiner

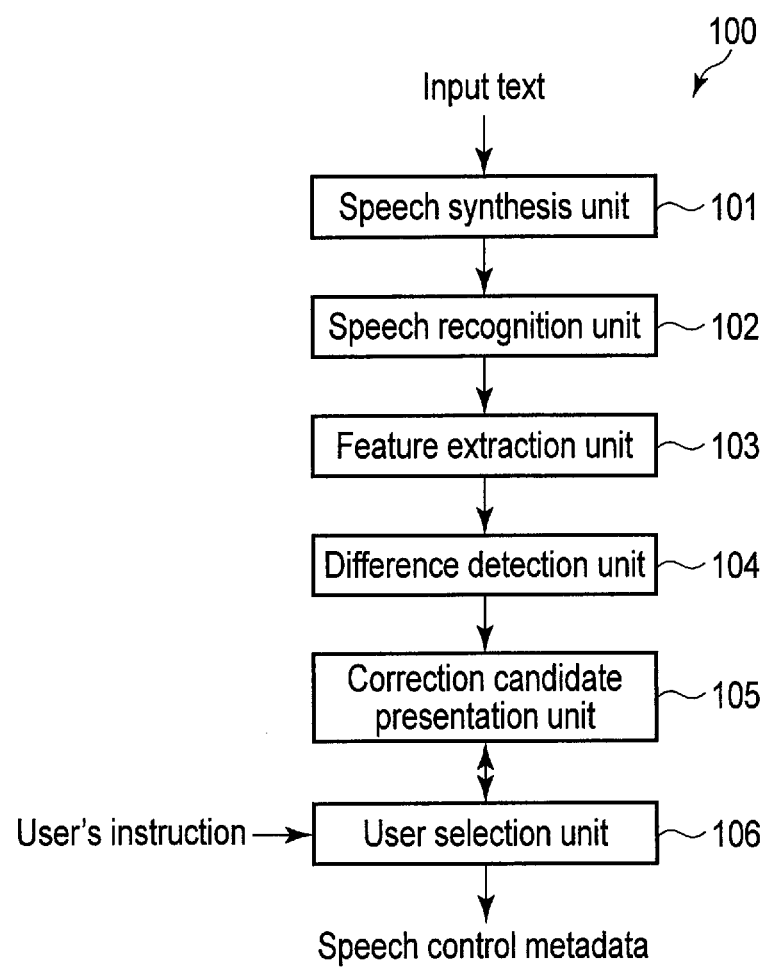
F I G. 1

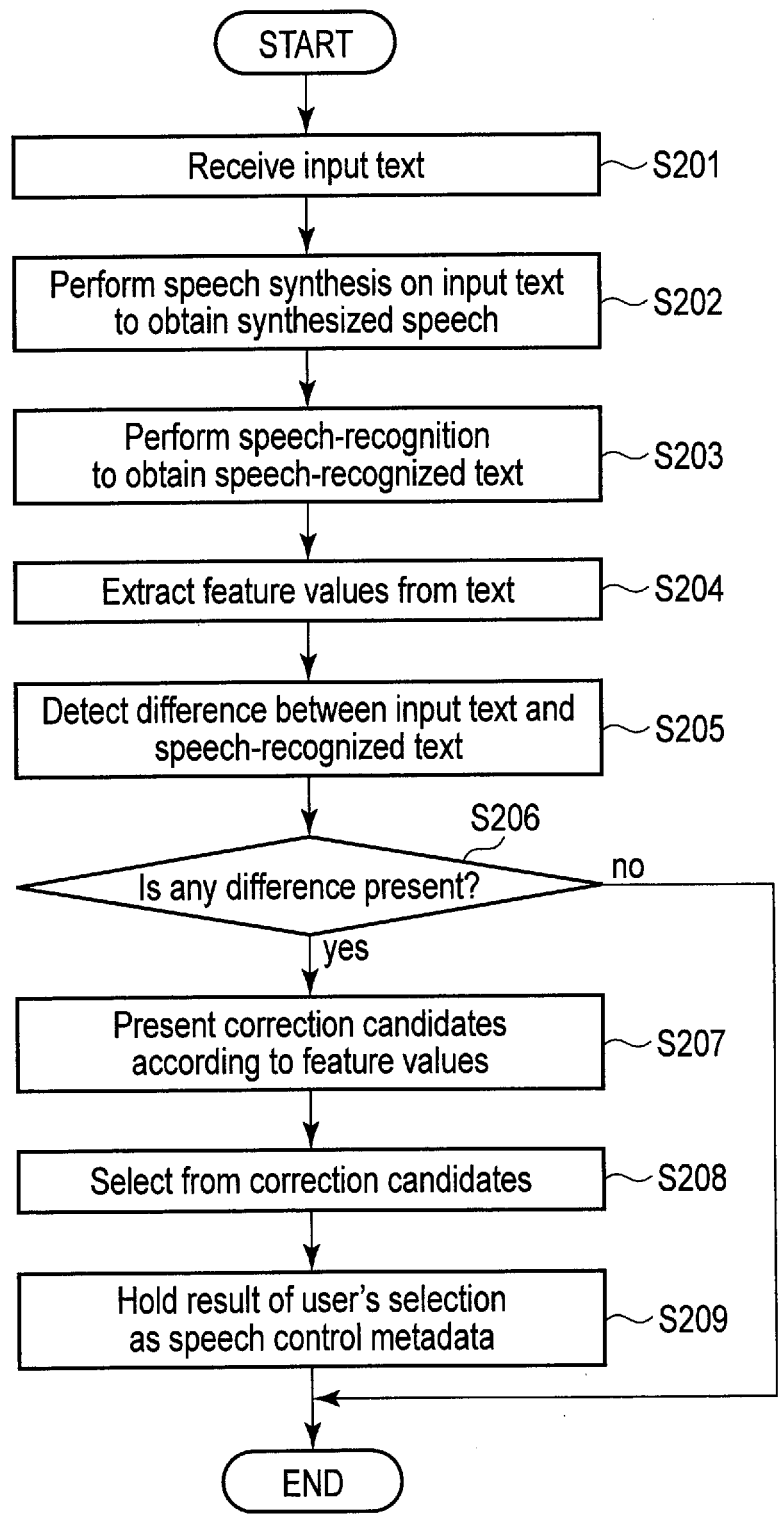
F I G. 2

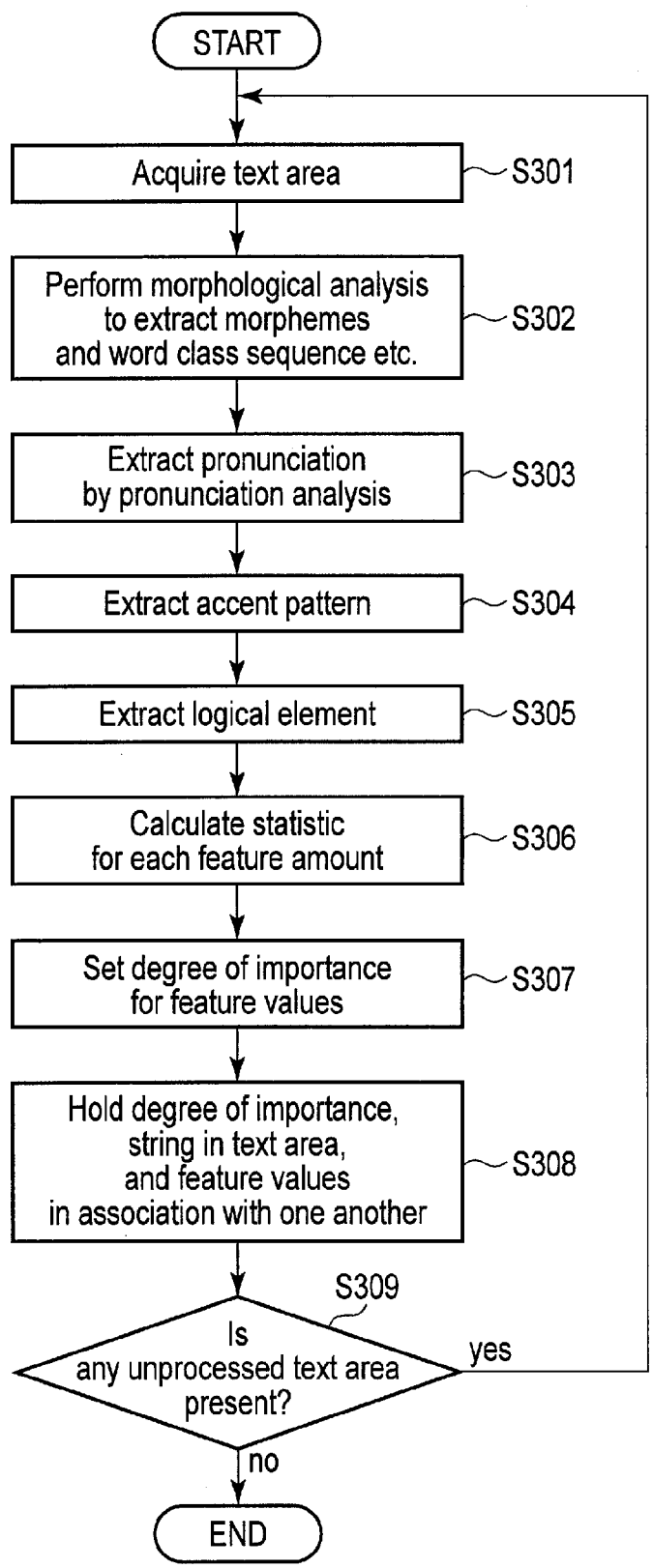
F I G. 3

| Position | Input text | Feature values | Degree of importance |
|---|---|---|---|
| Chapter#2,line(12) | 前年同期比で8件減少しているものの<br>*Zennen dokihide 8ken gensho shiteiru monono*<br>(despite decrease of 8 deaths compared to same term last year) | Sentence | High |
| Chapter#3,line(213) | 減少している点に関しては考証すべきである<br>*Gensho shiteiru tenni kansihtewa kosho subeki dearu*<br>(decrease should be studied) | Sentence, <dearu> style | Low |

F I G. 4A

| Position | speech-recognized text | Feature values | Degree of importance |
|---|---|---|---|
| Chapter#2,line(12) | 前年同期比で8件継承しているものの<br>*Zennen dokihide 8ken keisho shiteiru monon*<br>(despite succession of 8 deaths compared to same term last year) | Sentence | High |
| Chapter#3,line(213) | 緊張している点に関しては交渉すべきである<br>*Kincho shiteiru tenni kansihtewa kosho subeki dearu*<br>(negotiation should be conducted for tense situation) | Sentence, <dearu> style | Low |

F I G. 4B

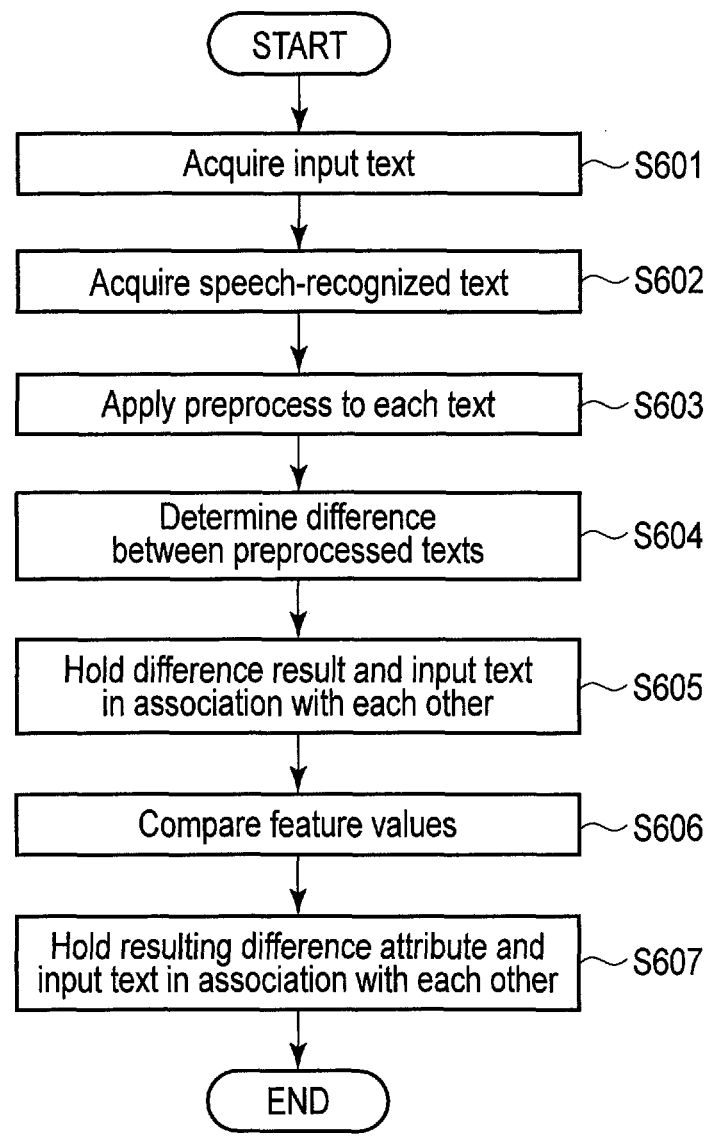
F I G. 6

| Position | Difference source | Difference destination | Feature values (word class) | Difference attribute |
|---|---|---|---|---|
| Chapter#2,line(12) | 減少 Gensho (decrease) | 継承 Keisho (succession) | Sahen noun (noun formed by removing suru from corresponding nominal verb) | Different expression |
| Chapter#3,line(213) | 減少 Gensho (decrease) | 緊張 Kincho (tense) | Sahen noun (noun formed by removing suru from corresponding nominal verb) | Different expression |
| Chapter#3,line(213) | 考証 Kosho (study) | 交渉 Kosho (negotiation) | Sahen noun (noun formed by removing suru from corresponding nominal verb) | Same-pronunciation and different-expression |

FIG. 7

| Position | Input text | Speech-recognized text | Checked |
|---|---|---|---|
| subtitle#2 | 近年死者数が減少している理由<br>Kinnen shishasuga gensho shiteiru riyu<br>(reason why number of deaths has been decreasing in recent years) | 近年死者数が減少している理由<br>Kinnen shishasuga gensho shiteiru riyu<br>(reason why number of deaths has been decreasing in recent years) | ☑ |
| chapter#2,line(12) | 前年同期比で8件減少しているものの、<br>Zennen dokihide 8ken gensho shiteiru monono<br>(despite decrease of 8 deaths compared to same term last year) | 前年同期比で8件継承しているものの、<br>Zennen dokihide 8ken keisho shiteiru monono<br>(despite succession of 8 deaths compared to same term last year) | ☐ |
| chapter#3,line(213) | 減少している点に関しては考証すべきである。<br>Gensho shiteiru tenni kansihtewa kosho subeki dearu<br>(decrease should be studied) | 緊張している点に関しては交渉すべきである。<br>Kincho shiteiru tenni kansihtewa kosho subeki dearu<br>(negotiation should be conducted for tense situation) | ☐ |
| chapter#5,line(14) | 三枝の会見はその減少している現象を<br>Sanshi no kaikenwa sono genshowo shiteiru genshowo<br>(interview with Sanshi, decrease phenomenon) | 三誌の会見はその減少している現象を<br>Sanshino kaikenwa sono gensho shiteiru genshowo<br>(interview with three magazines, decrease phenomenon) | ☐ |

FIG. 8A

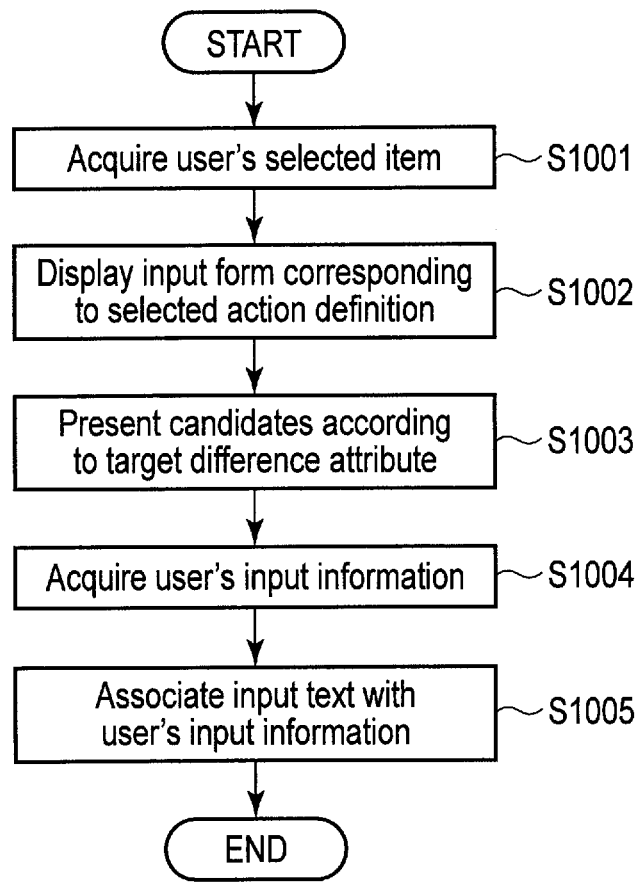
F I G. 10

CONTENT CREATION SUPPORT APPARATUS, METHOD AND PROGRAM

CROSS-REFERENCE TO RELATED APPLICATIONS

This application is based upon and claims the benefit of priority from prior Japanese Patent Application No. 2013-122953, filed Jun. 11, 2013, the entire contents of which are incorporated herein by reference.

FIELD

Embodiments described herein relate generally to a content creation support apparatus, method and program.

BACKGROUND

In recent years, computer environments for hardware and software have been improving significantly. In particular, services such as dedicated terminals for electronic books and content distribution are prevailing which had previously been impractical due to inadequate processing performance and insufficient storage capacities. New applications used for such services include contents collaborating with a text-to-speech function and contents with text-to-speech voice data embedded therein.

Furthermore, the service for electronic books as described above can be applied to books such as paper documents stored in libraries. Electronic data on a paper document can be obtained by, for example, converting the paper document into electronic data with a quality appropriate for mechanically reading the document aloud or creating text-to-speech voice data corresponding to the paper document.

However, misconversion may be included in an operation of obtaining text-to-speech voice data by converting a paper document into electronic data, and thus, the electronic data and the text-to-speech voice data may need to be corrected. A technique for correction is, for example, to detect and correct defective portions in a text-to-speech voice.

BRIEF DESCRIPTION OF THE DRAWINGS

FIG. 1 is a block diagram illustrating a content creation support apparatus according to a first embodiment;

FIG. 2 is a flowchart illustrating operation of the content creation support apparatus;

FIG. 3 is a flowchart illustrating a feature extraction process carried out by a feature extraction unit;

FIG. 4A is a diagram illustrating an example of processing results of the feature extraction process;

FIG. 4B is a diagram illustrating another example of processing results;

FIG. 6 is a flowchart illustrating a difference detection process performed by a difference detection unit;

FIG. 7 is a diagram illustrating an example of processing results performed by the difference detection unit;

FIG. 8A is a diagram illustrating an example of contents presented by a correction candidate presentation unit according to the first embodiment;

FIG. 10 is a flowchart illustrating a selection process performed by a user selection unit;

DETAILED DESCRIPTION

Figure 5:
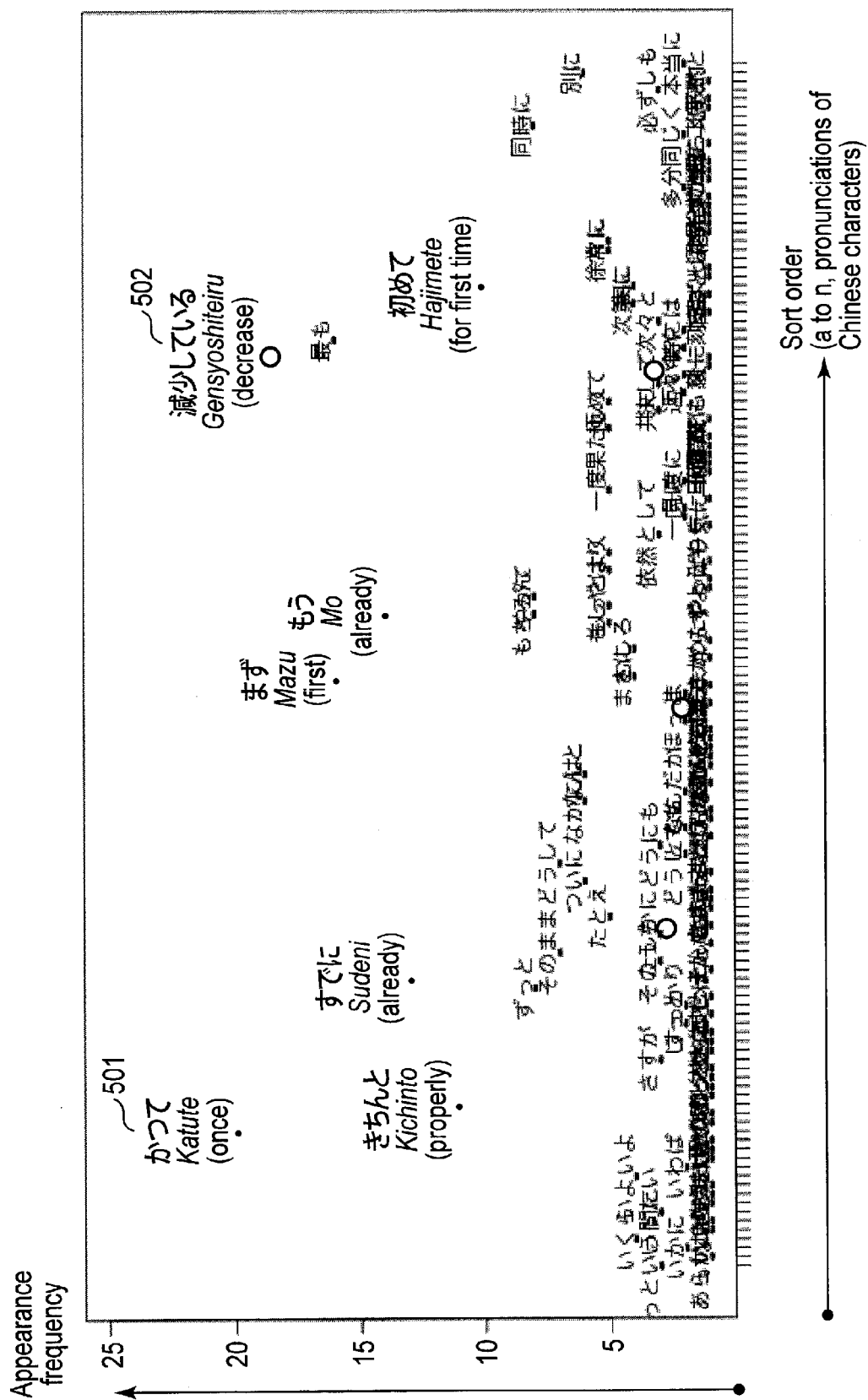
FIG. 5 is a diagram illustrating a specific example of the degree of importance set by the feature extraction unit.

Correction of text-to-speech voice as described above needs to listen to the reproduced voice data and to check the content of the voice data. Thus, the correction operation generally takes much time. Furthermore, the correction of text-to-speech voice requires skill to determine which portions of the voice data are inappropriate and how these portions are inappropriate, and further needs linguistic or acoustic knowledge and skills for accents and prosody. Moreover, when contents are corrected while listening to the voice, obvious or fatal errors and the like are difficult to understand. Thus, the correction operation with taking into account a priority and a degree of importance is difficult to perform.

In general, according to one embodiment, a content creation support apparatus includes a speech synthesis unit, a speech recognition unit, an extraction unit, a detection unit, a presentation unit and a selection unit. The speech synthesis unit is configured to perform a speech synthesis on a first text including an original string to generate a synthesized speech of the first text. The speech recognition unit is configured to perform a speech recognition on the synthesized speech to obtain a second text including a recognized string resulting from the speech recognition. The extraction unit is configured to extract feature values by performing a morphological analysis on each of the first text and the second text, the feature values each including one of pronunciations of the original string and the recognized string. The detection unit is configured to obtain a first difference string and a second difference string by extracting a difference between the first text and the second text, and to compare a first feature value that indicates one of the feature values corresponding to the first difference string and a second feature value that indicates one of the feature values corresponding to the second difference string, the first difference string that is a string in the first text including a difference from the second text, the second difference string that is a string in the second text including a difference from the first text. The presentation unit is configured to present one or more correction candidates according to the second feature value. The selection unit is configured to select at least one of the correction candidates in accordance with an instruction from a user.

A content creation support apparatus, method and program according to the embodiments will be described in detail with reference to the drawings. In the embodiments described below, units denoted by the same reference numerals are assumed to perform similar operations, and duplicate descriptions are appropriately omitted.

(First Embodiment)

A content creation support apparatus according to a first embodiment will be described with reference to a block diagram in FIG. 1.

A content creation support apparatus 100 according to the first embodiment includes a speech synthesis unit 101, a speech recognition unit 102, a feature extraction unit 103, a difference detection unit 104, a correction candidate presentation unit 105, and a user selection unit 106.

The speech synthesis unit 101 receives an input text (also referred to as a first text) that is a text including an externally input original string and performs a speech synthesis process on the input text to obtain a synthesized speech. The input text may be a document containing a text created by document editing software or the like or a document containing an electronically character-recognizable text into which a text printed on a paper medium has been converted by an optical character recognition (OCR) process. The speech synthesis process may be a general speech synthesis process, for example, a process that enables a synthesized speech to be output upon receiving a common text with a mixture of Chinese characters and Japanese phonetic characters.

The speech recognition unit 102 receives the synthesized speech from the speech synthesis unit 101 and performs a speech recognition process on the synthesized speech to obtain a speech-recognized text (also referred to as a second text) including a string resulting from the speech recognition. The string resulting from the speech recognition is also referred to as a recognized string. The speech recognition process may be a general speech recognition process. For example, the speech recognition process may be able to output the data including a text generating by performing the speech recognition on the synthesized speech and converting the recognized synthesized speech into the text with a mixture of Chinese characters and Japanese phonetic characters.

The speech synthesis process in the speech synthesis unit 101 and the speech recognition process in the speech recognition unit 102 may include the same input/output specifications and need not use a common language, a common acoustic model, or a common dictionary in the process. That is, the language, the acoustic model, and the dictionary are like black boxes, and each of the processes may use a mixture of applications and techniques from different vendors.

The feature extraction unit 103 receives the input text and the speech-recognized text from the speech recognition unit 102 and performs a morphological analysis on each of the input text and the speech-recognized text. Moreover, based on the results of the morphological analysis, the feature extraction unit 103 extracts feature values indicative of what features are possessed by each word contained in the input text and the speech-recognized text. A specific example of the feature values will be described below with reference to FIG. 3.

The difference detection unit 104 receives the input text and the speech-recognized text from the feature extraction unit 103 and extracts a string corresponding to a difference between the input text and the speech-recognized text. The process of extracting the difference between the texts is a common process and will thus not be described below. According to the present embodiment, a string in the input text including a difference from the speech-recognized text is hereinafter referred to as a first difference string. A string in the speech-recognized text including a difference from the input text is hereinafter referred to as a second difference string. Moreover, the difference detection unit 104 compares the feature values of the first difference string with the feature values of the second difference string to obtain a difference attribute indicative of how the feature values vary between the first difference string and the second difference string. The first embodiment includes a case where the string is one character.

The correction candidate presentation unit 105 receives the input text, the speech-recognized text, the first difference string, the second difference string, and the feature values of the first difference string and the feature values of the second difference string from the difference detection unit 104. The correction candidate presentation unit 105 presents one or more correction candidates corresponding to the feature values of the second difference string, according to the degree of importance that is an indicator calculated based on the feature values of the first difference string.

The user selection unit 106 receives an instruction from a user, extracts correction candidates selected based on the instruction from the user, from the correction candidate presentation unit 105, and generates speech control metadata based on the selected correction candidate. The speech control metadata is metadata that determines how to read out the string in the input text.

An operation of the content creation support apparatus 100 will be described with reference to a flowchart in FIG. 2.

In step S201, the speech synthesis unit 101 receives an input text.

In step S202, the speech synthesis unit 101 performs a speech synthesis on the input text to obtain a synthesized speech.

In step S203, the speech recognition unit 102 performs speech recognition on the synthesized speech to convert the synthesized speech into a text, thus obtaining a speech-recognized text.

In step S204, the feature extraction unit 103 performs a morphological analysis on strings in the input text and the speech-recognized text to extract feature values.

In step S205, the difference detection unit 104 detects a difference between the input text and the speech-recognized text.

In step S206, the difference detection unit 104 determines whether or not any difference is present between the input text and the speech-recognized text. If any difference is present, that is, the second difference string is present, the process proceeds to step S207. If no difference is present, the operation is ended.

In step S207, the correction candidate presentation unit 105 presents correction candidates according to the feature values of the second difference string.

In step S208, the user selection unit 106 selects from the correction candidates in accordance with an instruction from the user.

In step S209, the user selection unit 106 generates and holds speech control metadata for the selected correction candidate. When the speech control metadata is held, the speech control metadata may be stored in an internal memory or in an external storage (this is not shown in the drawings).

A feature extraction process performed by the feature extraction unit 103 will be described with reference to a flowchart in FIG. 3. The feature extraction process illustrated in FIG. 3 may be similarly performed both on the input text and on the speech-recognized text.

In step S301, a text area in the text is acquired. The text area refers to an area that is appropriately processed by the user at a time, for example, an entire book or a plurality of books, or a chapter or a unit in a document. An area of the text area can be freely specified by a user.

In step S302, a morphological analysis process is performed on a string in the text area to extract, as a feature value of the string, the morphemes and the word class sequence, the presence or absence of a named entity, and surface expressions.

In step S303, an analysis of pronunciation is carried out on the string in the text area to extract a pronunciation (and/or wording) as a feature value of the string.

In step S304, an analysis of an accent pattern is performed on the string in the text area to extract the accent pattern of the string as a feature value of the string.

In step S305, logical element information (also referred to as a document element) indicative of a component of a document such as a heading or an index is extracted from the string in the text area as feature value of the string.

In step S306, a statistic is calculated for each of the feature values. In this case, an appearance frequency is calculated as a statistic.

In step S307, the degree of importance is set for each feature value. The degree of importance may be set based on, for example, a variation in speech, a variation in word class, or a variation in accent pattern. The order of the degree of importance may be defined according to the order of feature values to be preferentially corrected. In a specific example, a higher priority is expected to be often given to the correction of the pronunciation than to the correction of the word class. Thus, a higher degree of importance may be set for the correction of the pronunciation.

Furthermore, the degree of importance may be set based on the distribution state of each feature value or the statistic (appearance frequency) which is calculated from the input text and the genre of the input text and the like. Additionally, for example, the degree of importance may be preset such that the pronunciation of a title is inevitably corrected or the degree of importance may be set such that the beginning of the input text has the highest degree of importance and that the degree of importance decreases toward the end of the text.

In step S308, the degree of importance, the string in the text area, and the feature values are held in association with one another. The associations may be held by the feature extraction unit 103 or stored in an external memory.

In step S309 determines whether or not any unprocessed text area is present. If an unprocessed text area is present, the process returns to step S301 to repeat similar processing. If no unprocessed text area is present, the feature extraction process is ended.

The processing from step 302 to step S305 in which the feature value is extracted may be performed in any order.

The processing results of the feature extraction process in the feature extraction unit 103 will be described with reference to FIG. 4.

FIG. 4A shows a correspondence table 400 for the input text. FIG. 4B shows a correspondence table 450 for the speech-recognized text.

In the correspondence table 400 in FIG. 4A, a position 401, an input text 402, a feature value 403, and the degree of importance 404 are associated with one another. The position 401 indicates a position where the string appears in the input text. The feature value 403 is a feature value calculated by the feature extraction unit 103 and includes, for example, the pronunciation, the accent pattern, and the document element. The degree of importance 404 is set by the feature extraction unit 103. The degree of importance is indicated herein by "high" or "low" but may be represented by numerical values. Specifically, the following are associated with one another: the position 401 "Chapter #3, line (213)", the input text 402 "減少している点に 関しては考証すべ きである (gensho shiteiru tenni kanshitewa kosho subeki dearu), (the decrease should be studied)", the feature value 403 "sentence, <である (dearu)> style", and the degree of importance 404 "low".

In the correspondence table 450 in FIG. 4B, the position 401, a speech-recognized text 405, the feature value 403, and the degree of importance 404 are associated with one another. The speech-recognized text 405 indicates a string appearing in the speech-recognized text. Specifically, the following are associated with one another: the position 401 "Chapter #3, line (213)", the speech-recognized text 405 "緊張している点に 関しては交渉すべ きで ある (kincho shiteiru tenni kanshitewa kosho subeki dearu), (negotiation should be conducted for the tense situation)", the feature value 403 "sentence, <である (dearu)> style", and the degree of importance 404 "low".

In this case, both the input text 402 and the speech-recognized text 405 are displayed on a sentence by sentence basis. However, the string may be divided into morphemes, each of which may be associated with the position 401, the feature value 403, and the degree of importance 404.

A specific example of the degree of importance set by feature extraction unit 103 based on the appearance frequency will be described with reference to FIG. 5.

FIG. 5 is a plot of the results of a morphological analysis performed on strings in the input text. The vertical axis indicates the appearance frequency. The horizontal axis indicates the appearance order of a particular phrase in the input text. The plotted strings are conjunctions and adverbs and are shown by surface expressions.

Moreover, phrases including sahen nominal verbs (減少している (gensho shiteiru), (decreasing), 緊張している (kincho shiteiru), (tense), and the like) are also listed. The feature extraction unit 103 sets higher degrees of importance for strings with higher appearance frequencies. Specifically, strings such as a string 501 "かつて (katsute), (once)" and a string 502 ", 減少している (gensho shiteiru), (decrease)" have high appearance frequencies. Thus, if these stings are incorrect, the effect of correction is expected to be high. Hence, the degree of importance may be set to be high for the string 501 "かつて (katsute)" and the string 502 "減少している (gensho shiteiru)".

Furthermore, the results of extraction of document elements as the feature values of the strings in the text indicate that the input document is described in a structured document format such as in hypertext markup language (HTML) and that some strings are provided with document elements (a title, a subtitle, h1, h2, and the like) corresponding to headings. For these strings, plotted marker symbols or colors may be changed for display so as to highlight the differences between the strings and other candidates. In the example in FIG. 5, a blank plot indicative of the string 502 "減少している (gensho shiteiru)" corresponds to a heading. The degree of importance may be set to be high for such strings.

A detection process performed by the difference detection unit 104 will be described with reference to a flowchart in FIG. 6.

In step S601, an input text is acquired.

In step S602, a speech-recognized text is acquired.

In step S603, the input text and the speech-recognized text are preprocessed. The preprocess is a process for improving the accuracy of a comparison between the input text and the speech-recognized text. For example, the preprocess may be deletion of empty rows contained in the text data, normalization of fluctuation of description of punctuation marks and symbols, determination of whether hiragana, katakana, and digit sequences are all described in one byte or two bytes, and unification of logical elements contained in each row (for example, only one sentence is contained in one row).

In step S604, the difference between the input text and speech-recognized text preprocessed in step S603 is determined to extract a first difference string and a second difference string.

In step S605, the following are held in association with one another: the first difference string, a position in the input text containing the first difference string, and the feature values of the first difference string. The associations may be held by the difference detection unit 104 or stored in an external memory.

In step S606, the feature values of the first difference string are compared with the feature values of the second difference string.

In step S607, the result of the comparison of the feature values, that is, the difference attribute of the feature values, is acquired and stored in association with the input text. The difference attribute is an indicator indicative of how the feature values differ between the strings. For example, if a comparison between the first difference string and the second difference string indicates the same pronunciation but different expressions, the difference attribute is "same-pronunciation and different-expression". If the comparison indicates the same expression but different accent patterns, the difference attribute is "different-accent".

The results of processing performed by the difference detection unit 104 will be described with reference to FIG. 7.

In a correspondence table 700 shown in FIG. 7, the position 401, a difference source 701, a difference destination 702, a feature value 703, and a difference attribute 704 are associated with one another.

The difference source 701 is the surface expression of the first difference string in the input text. The difference destination 702 is the surface expression of the second difference string in the speech-recognized text. The feature value 703 is, in this case, the name of a word class. The difference attribute 704 indicates how the feature value of the difference source 701 is different from the feature value of the difference destination 702. In a specific example, the following are associated with one another: the position 401 "Chapter #2, line (12)", the difference source 701 "減少 (gensho)", the difference destination 702 "継承 (keisho)", the feature value 703 "sahen noun (a noun formed by removing <する (suru)> from the corresponding nominal verb)", and the difference attribute 704 "different expression".

A specific example of contents presented by the correction candidate presentation unit 105 will be described with reference to FIGS. 8A and 8B.

Figure 8B:
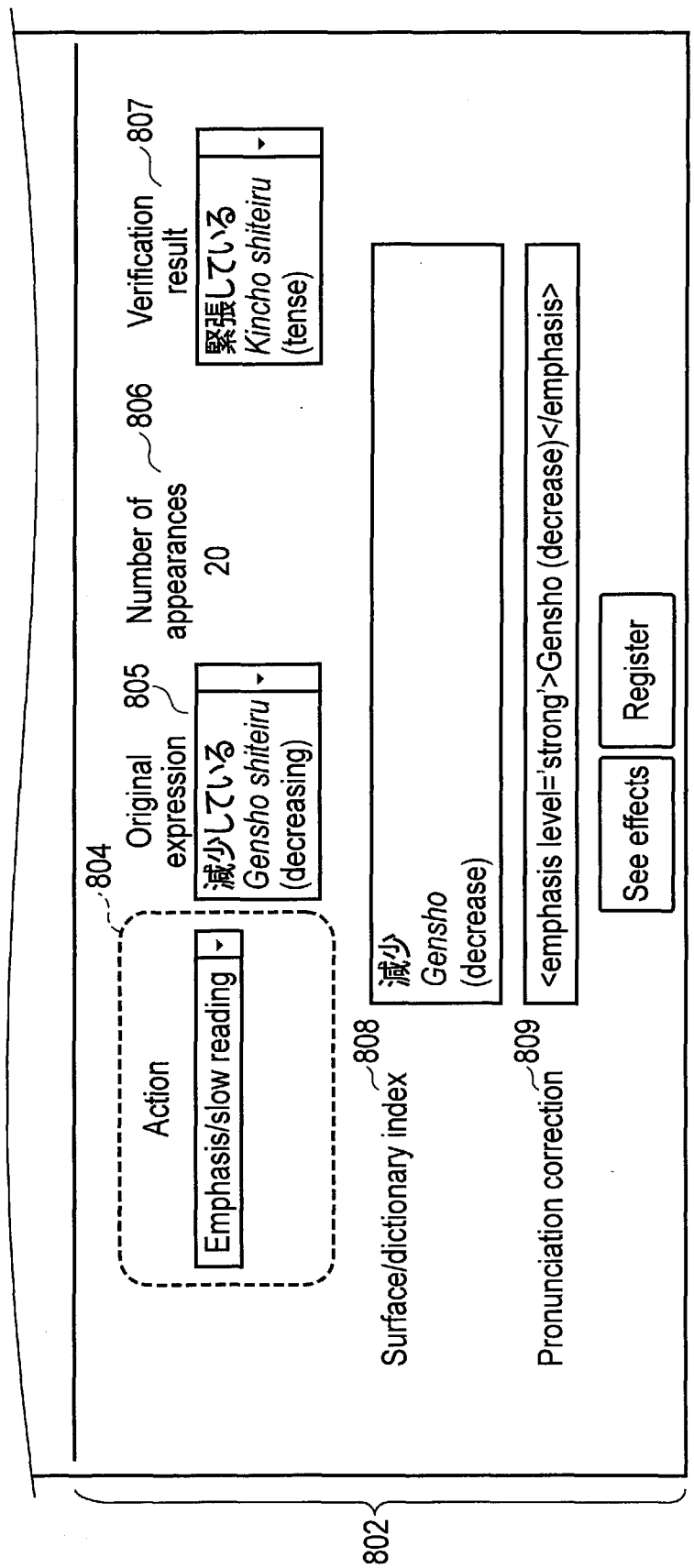
FIG. 8B is a diagram illustrating an example of contents presented by a correction candidate presentation unit.

FIGS. 8A and BE shows an example in which a point to be corrected is displayed on a monitor screen. Display area 801 in FIG. 8A presents such differences between the input text and the speech-recognized text as shown in FIG. 4. A lower display area 802 in FIG. 8B presents elements that allow selection of a correction method indicating what correction is to be performed.

Specifically, the display area 801 displays the position 401, the input text 402, and the speech-recognized text 405 in association with one another. The second difference string in the speech-recognized text 405 may be highlighted by changing the color or font of characters in the string, underlining the string, or adding a marker to the string, based on the difference in attribute resulting from the feature extraction process and the difference detection process. Moreover, a check box 803 may be provided which can be checked in order to indicate that the string has been processed.

The display area 802 includes an action 804, an original expression 805, the number of appearances 806, a verification result 807, a surface expression and dictionary index 808, and pronunciation correction 809.

The action 804 indicates what process is to be performed on the string with the difference. The original expression 805 displays the string in the input text. The number of appearances 806 is indicative of the number of times that the string appears in the text. The verification result 807 is a string obtained by converting the speech recognition corresponding to the original expression 805 into a text. The surface expression and dictionary index 808 indicates a surface expression. The pronunciation correction 809 is a block in which the description of the synthesized speech is corrected using an XML format such as an XML path language (XPath) notation.

Specifically, a verification result "前年同期比で8件 継承しているものの (zennen dokihi de 8ken keisho shiteiru monono), (despite a succession of 8 deaths compared to the same term last year)" is different from an expression in the original "前年同期比で8件減少しているものの (zennen dokihi de 8ken gensho shiteiru monono), (despite a decrease of 8 deaths compared to the same term last year)" appearing at the position 401 "chapter#2, line (12)", that is, in the 12th line in Chapter 2. This indicates the presence of a difference.

Similarly, a verification result "緊張している点に 関しては交渉すべきである (kincho shiteiru tenni kanshitewa kosho subeki dearu), is different from an expression in the original "減少している点に 関しては考証すべ きである (gensho shiteiru tenni kanshitewa kosho subeki dearu)" appearing at the position 401 "chapter#3, line (213)", that is, in the 213th line in Chapter 3. Thus, two differences are present. A case with different expressions and different pronunciations is distinguished from a case with the same pronunciation and different expressions depending on the type of highlight.

Now, an example of selection items for the action 804 will be described with reference to FIG. 9.

Figure 9:
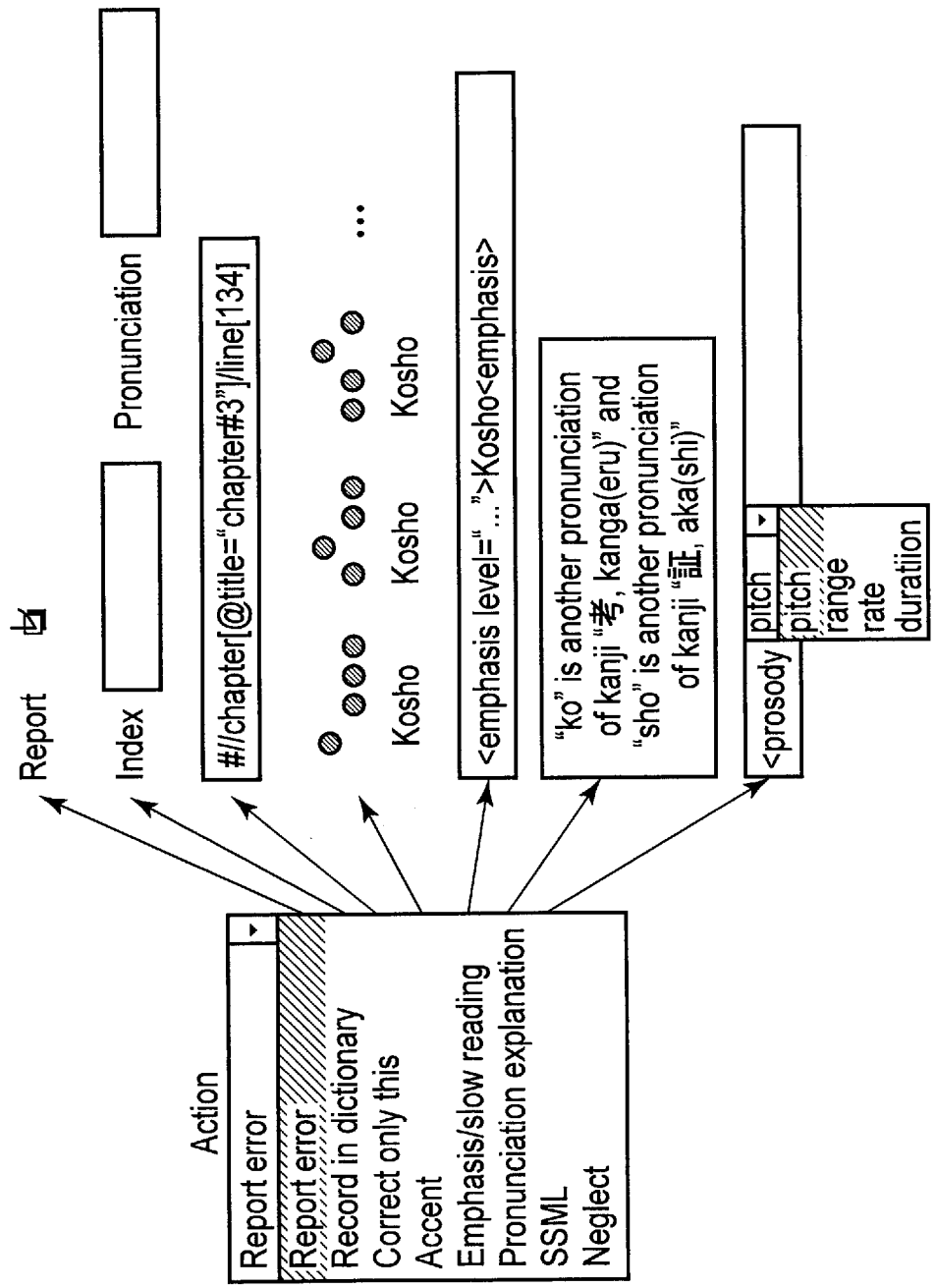
FIG. 9 is a diagram illustrating an example of selection items for action.

As shown in FIG. 9, an example of selection items may be "report error", "record in dictionary", "correct only this", "accent", "emphasis/slow reading", "pronunciation explanation", "speech synthesis markup language (SSML)", and "neglect".

"Report error" is a process of reporting only the presence of an error without performing a specific correction operation and is selected when processing is left to the subsequent step or another operator.

"Record in dictionary" is a process of recording the correct pronunciation for expressions with incorrect pronunciations such as unknown words, new words, proper nouns, and technical terms.

"Correct only this" is a process of embedding, for correction of a word to be recorded in the dictionary and for any other correction, information specifying a range in order to limit the range of the correction. In this case, for example, the XPath notation may be used for the specification or information on an offset from a predetermined position (the beginning of a chapter or a unit) may be specified.

The "accent" is a process of specifying the accent pattern of the string with the difference. For example, several types of accent patterns may be prepared so that one of the accent patterns can be selected.

"Emphasis/slow reading" is a process of applying a tag for text-to-speech voice control which is indicative of whether to place emphasis on a specified expression by increasing the volume at which the expression is read or reducing the speed at which the expression is read.

"Pronunciation explanation" is a process of presenting candidates for the pronunciation or adding complementary information when the pronunciation includes a plurality of possibilities or a fluctuation. For example, for the string "考証 (kosho)", explanatory voice data such as the following may be generated: "考 (ko)" is another pronunciation of a kanji "考 (考える (kangaeru))" and "証, sho" is another pronunciation of a kanji "証 (証し (akashi))".

"SSML" is a process of supporting inputting of common voice control tags and attribute information.

"Neglect" is a process of avoiding correcting the string.

A selection process performed by the user selection unit 106 will be described with reference to a flowchart in FIG. 10.

In step S1001, the user's selected action item is loaded.

In step S1002, an input form is presented for the action selected in step S1001. Specifically, a text form and selection candidates are presented which correspond to the process selected from the list of actions by the user.

In step S1003, correction candidates are presented according to the difference attribute of the second difference string to be processed. For example, for the pronunciation, a plurality of candidates are presented. For the accent, expected candidates for the access pattern are presented.

In step S1004, one of the candidates in step S1003 selected by the user or input information input by the user is acquired.

In step S1005, the user's input information is associated with the input text to generate speech control metadata. Thus, the operation of the selection process performed by the user selection unit 106 ends.

The stored speech control metadata is used for speech synthesis of a text by being referenced when text-to-speech data for book content is created. Alternatively, a content creator may use the stored speech control metadata for a preprocess for preliminarily creating a voice file.

The first embodiment illustrated above includes calculating the feature values of an input text and the feature values of a text obtained by performing speech synthesis and then speech recognition on the input text, determining the difference between the texts and comparing the feature values between the texts, and presenting strings to be corrected to the user according to the degree of importance. Thus, speech editing can be achieved with minimized temporal costs for listening to the voice without the need to listen to and check the text-to-speech data on a data-by-data basis. Therefore, accurate contents can be created.

(Second Embodiment)

When an operation for correcting text-to-speech data is performed, since operational skills vary among users, it is not preferable that a user with a low skill level for the correction operation perform an advanced correction operation such as correction of SSML parameters. Thus, a second embodiment sets correction items depending on the operator's skill level to allow data to be efficiently corrected.

Figure 11:
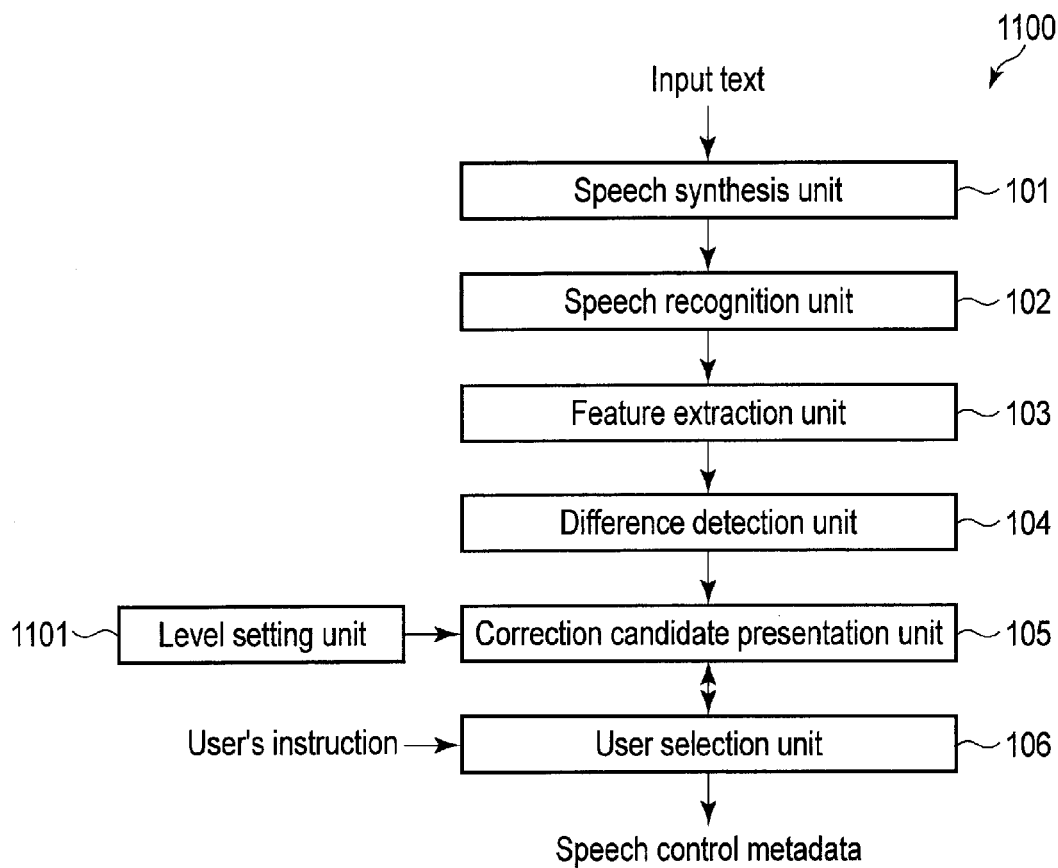
FIG. 11 is a block diagram illustrating a content creation support apparatus according to a second embodiment.

A content creation support apparatus according to the second embodiment will be described with reference to a block diagram in FIG. 11.

A content creation support apparatus 1100 according to the second embodiment includes a speech synthesis unit 101, a speech recognition unit 102, a feature extraction unit 103, a difference detection unit 104, a correction candidate presentation unit 105, a user selection unit 106, and a level setting unit 1101.

The speech synthesis unit 101, speech recognition unit 102, feature extraction unit 103, difference detection unit 104, correction candidate presentation unit 105, and user selection unit 106 are similar to the speech synthesis unit 101, speech recognition unit 102, feature extraction unit 103, difference detection unit 104, correction candidate presentation unit 105, and user selection unit 106 according to the first embodiment, and a description thereof will thus be omitted.

The level setting unit 1101 sets a skill level of the user and sets candidates for action displayed by the correction candidate presentation unit 105, according to the skill level. The skill level represents the user's editing ability and is also referred to as an editing level. A method for determining the user's skill level may include, for example, allowing the user to preliminarily input the user's level of the operation skill or determining the user's skill level by conducting preliminary tests before editing of text-to-speech data.

An example of presentation performed by the correction candidate presentation unit 105 according to the second embodiment will be described with reference to FIG. 12.

Figure 12:
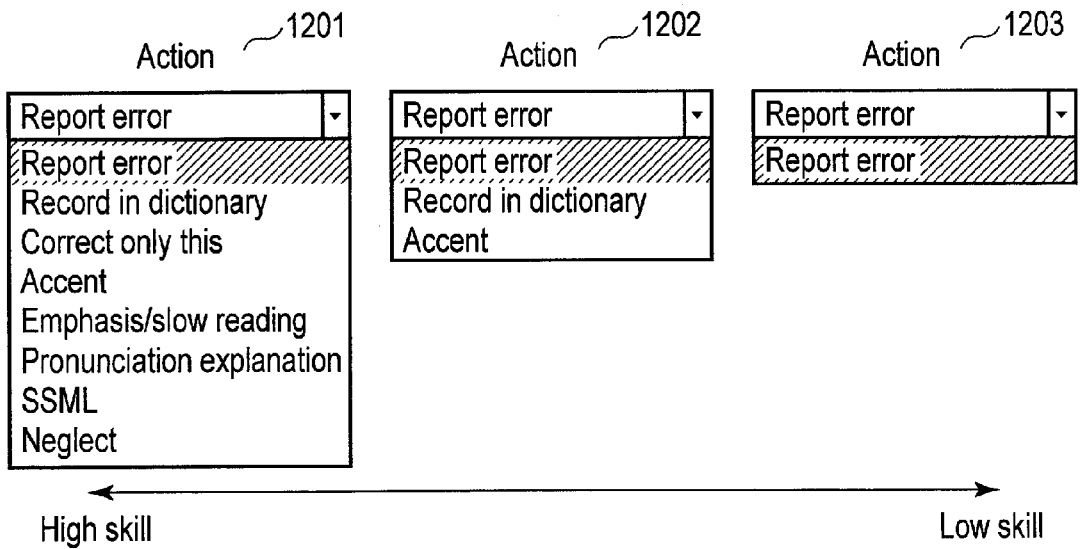
FIG. 12 is a diagram illustrating an example of contents presented by the correction candidate presentation unit according to the second embodiment.

As shown in FIG. 12, correction actions are presented which are limited according to the needed skill. A user with a high skill level sufficient to be able to understand the meanings of parameters for speech synthesis and adjustment means can select all actions, for example, as shown by action 1201.

On the other hand, a user with a normal level who can correct pronunciations and accents is presented with three actions "report error", "record in dictionary", and "accent", as shown by action 1202.

Moreover, only "report error" is presented to a user who is a beginner for correction of text-to-speech voice or who has a skill level at which the user can only detect errors, as shown by action 1203.

Once the skill level is determined, the user may log in to automatically limit the selection of the action. Furthermore, when the user's duration of experience of operations and the user's days of experience of operations become equal to or longer than respective thresholds, the skill level may be reviewed and increased by one or further determined by means of preliminary tests.

According to the second embodiment illustrated above, even with a variation in the skill needed for the correction operation, the operation can be performed on a step by step basis depending on the operator's skill level. This allows inappropriate corrections to be avoided. Hence, the quality of a repository as a whole can be improved by repeating a cycle in which, for example, an enormous number of contents that may contain pronunciation errors are released, whereas the contents are corrected based on feedback from users.

The flow charts of the embodiments illustrate methods and systems according to the embodiments. It will be understood that each block of the flowchart illustrations, and combinations of blocks in the flowchart illustrations, can be implemented by computer program instructions. These computer program instructions may be loaded onto a computer or other programmable apparatus to produce a machine, such that the instructions which execute on the computer or other programmable apparatus create means for implementing the functions specified in the flowchart block or blocks. These computer program instructions may also be stored in a computer-readable memory that can direct a computer or other programmable apparatus to function in a particular manner, such that the instruction stored in the computer-readable memory produce an article of manufacture including instruction means which implement the function specified in the flowchart block or blocks. The computer program instructions may also be loaded onto a computer or other programmable apparatus to cause a series of operational steps to be performed on the computer or other programmable apparatus to produce a computer programmable apparatus which provides steps for implementing the functions specified in the flowchart block or blocks.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A content creation support apparatus, comprising:
a processor, programmed to
perform a speech synthesis on a first text including an original string to generate a synthesized speech of the first text;
perform a speech recognition on the synthesized speech to obtain a second text including a recognized string resulting from the speech recognition;
extract feature values by performing a morphological analysis on each of the first text and the second text, the feature values each including one of pronunciations of the original string and the recognized string;
obtain a first difference string and a second difference string by extracting a difference between the first text and the second text, and to compare a first feature value that indicates one of the feature values corresponding to the first difference string and a second feature value that indicates one of the feature values corresponding to the second difference string, the first difference string that is a string in the first text including a difference from the second text, the second difference string that is a string in the second text including a difference from the first text;
present one or more correction candidates according to the second feature value; and
select at least one of the correction candidates in accordance with an instruction from a user.

2. The apparatus according to claim 1, wherein the extracting feature values associates a degree of importance with the second difference string, the degree of importance being calculated based on the first feature value, and wherein the presenting the correction candidates is in order of decreasing the degree of importance.

3. The apparatus according to claim 1, wherein the extracting feature values further extracts, as each of the feature values, an accent pattern, presence or absence of a named entity, and wording.

4. The apparatus according to claim 1, wherein the extracting feature values further extracts, as each of the feature values, a word class and a document element that indicates a component of a document in the first text.

5. The apparatus according to claim 1, wherein the extracting feature values further extracts, as each of the feature values, a surface expression of a string.

6. The apparatus according to claim 5, wherein the extracting feature values calculates an appearance frequency of the surface expression of the first difference string as a degree of importance, and wherein the presenting the correction candidates is in order of decreasing the degree of importance.

7. The apparatus according to claim 1, wherein the processor sets an editing level representing the user's editing ability, and
wherein the presents candidates for action for the second difference string according to the editing level.

8. A content creation support method, comprising the following steps, when executed by a processor,
performing a speech synthesis on a first text including an original string to generate a synthesized speech of the first text;
performing a speech recognition on the synthesized speech to obtain a second text including a recognized string resulting from the speech recognition;
extracting feature values by performing a morphological analysis on each of the first text and the second text, the feature values each including one of pronunciations of the original string and the recognized string;
obtaining a first difference string and a second difference string by extracting a difference between the first text and the second text, to compare a first feature value that indicates one of the feature values corresponding to the first difference string and a second feature value that indicates one of the feature values corresponding to the second difference string, the first difference string that is a string in the first text including a difference from the second text, the second difference string that is a string in the second text including a difference from the first text;
presenting one or more correction candidates according to the second feature value; and
selecting at least one of the correction candidates in accordance with an instruction from a user.

9. The method according to claim 8, wherein the extracting the feature values associates a degree of importance with the second difference string, the degree of importance being calculated based on the first feature value, and wherein the presenting the one or more correction candidates presents the correction candidates in order of decreasing the degree of importance.

10. The method according to claim 8, wherein the extracting the feature values further extracts, as each of the feature values, an accent pattern, presence or absence of a named entity, and wording.

11. The method according to claim 8, wherein the extracting the feature values further extracts, as each of the feature values, a word class and a document element that indicates a component of a document in the first text.

12. The method according to claim 8, wherein the extracting the feature values further extracts, as each of the feature values, a surface expression of a string.

13. The method according to claim 12, wherein the extracting the feature values calculates an appearance frequency of the surface expression of the first difference string as a degree of importance, and wherein the presenting the correction candidates is in order of decreasing the degree of importance.

14. The method according to claim 8, further comprising setting an editing level representing the user's editing ability,
wherein the presenting the one or more correction candidates presents candidates for action for the second difference string according to the editing level.

15. A non-transitory computer readable medium including computer executable instructions, wherein the instructions, when executed by a processor, cause the processor to perform a method comprising:
performing a speech synthesis on a first text including an original string to generate a synthesized speech of the first text;
performing a speech recognition on the synthesized speech to obtain a second text including a recognized string resulting from the speech recognition;
extracting feature values by performing a morphological analysis on each of the first text and the second text, the feature values each including one of pronunciations of the original string and the recognized string;
obtaining a first difference string and a second difference string by extracting a difference between the first text and the second text, to compare a first feature value that indicates one of the feature values corresponding to the first difference string and a second feature value that indicates one of the feature values corresponding to the second difference string, the first difference string that is a string in the first text including a difference from the second text, the second difference string that is a string in the second text including a difference from the first text;

presenting one or more correction candidates according to the second feature value; and selecting at least one of the correction candidates in accordance with an instruction from a user.

* * * * *